Nov. 13, 1951  F. F. OLSON  2,574,838
EDUCATIONAL HEAD STRUCTURE WITH SHIFTABLE VOCAL MEMBERS
Filed Feb. 9, 1949  3 Sheets-Sheet 1

INVENTOR.
FRANCES F. OLSON
BY
Gustav A. Wolff
ATT

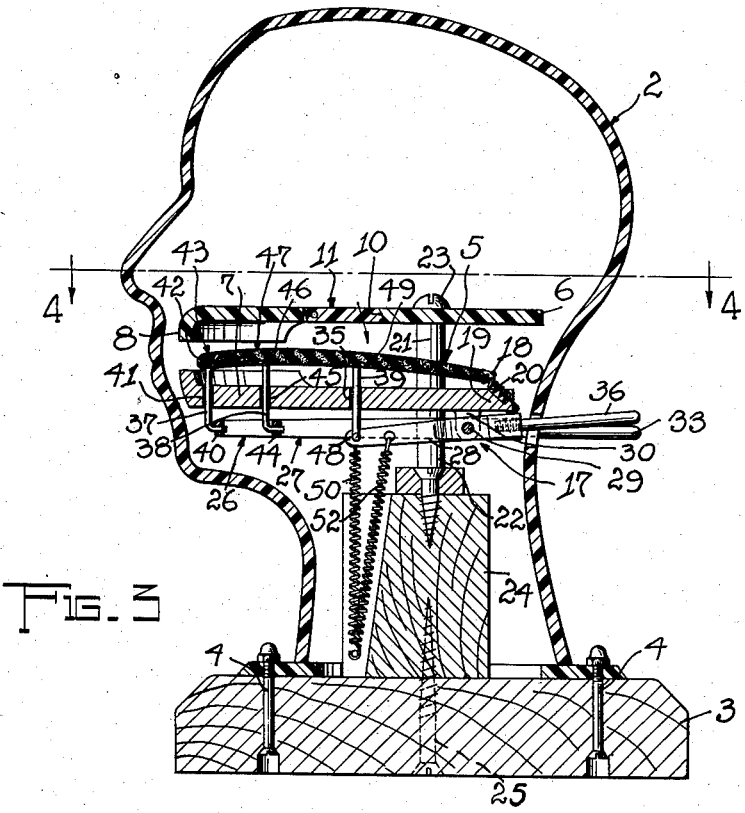
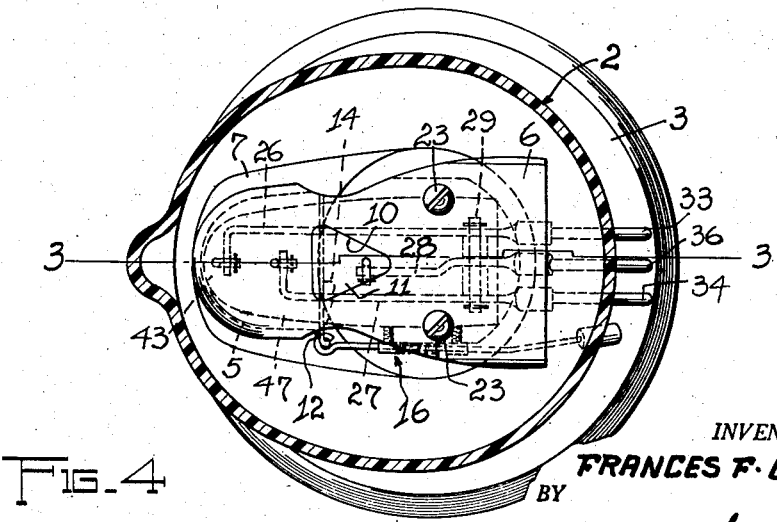

Nov. 13, 1951  F. F. OLSON  2,574,838
EDUCATIONAL HEAD STRUCTURE WITH SHIFTABLE VOCAL MEMBERS
Filed Feb. 9, 1949  3 Sheets-Sheet 3

INVENTOR.
FRANCES F. OLSON

Patented Nov. 13, 1951

2,574,838

UNITED STATES PATENT OFFICE 2,574,838

EDUCATIONAL HEAD STRUCTURE WITH SHIFTABLE VOCAL MEMBERS

Frances Farr Olson, Zanesville, Ohio

Application February 9, 1949, Serial No. 75,388

10 Claims. (Cl. 35—28)

1

This invention relates to educational apparatus visibly and directly, suggestively indicating general positions and configurations of the vocal organism of a person.

The primary object of the invention is the provision of an educational apparatus simulating the head of a person and including a visible, flexible tongue member and a plurality of operating means coupled with spaced areas of the tongue member and adapted to effect by individual and joint action, shifting and shaping of parts of the tongue member to give same different shapes and configurations necessary for producing articulate and intelligible sounds in the pronunciation of vowels, consonants and general combinations thereof.

Another object of the invention is the provision of an educational apparatus simulating the head of a person and including an outer, transparent shell, a flexible tongue member visibly mounted within said shell in proper coordination with respect to upper and lower transparent jaw members therein, and a plurality of operating means coupled with said tongue member and including actuating members extended outside of said shell, the operating means being coupled with spaced, definite areas of the tongue member to permit shaping of the tongue member to different shapes and configurations necessary for producing articulate and intelligible sounds in the pronunciation of vowels, consonants and general combinations thereof.

A further object of the invention is the provision of an educational apparatus of the type described, including in addition to the flexible tongue member previously referred to, tiltable means simulating the soft palate or velum of the vocal and speech organism of a person and operating means coupled with said tiltable means adapted to move same up or down to locate the tiltable members so as to vary the throat opening necessary for producing different articulate and intelligible nasal sounds of certain vowels, consonants and general combinations thereof.

Still another object of the invention is the provision of an educational apparatus of the type described, including in addition to the flexible tongue member previously described, vibrating means arranged in the front portion of the throat of the outer shell previously referred to, the vibrating means being actuated by operating means cooperating with illuminating means so as to indicate by vibration and illumination the proper place originating the gutturals or velars as distinct, articulate and intelligible sounds.

2

The above and other inherent objects and advantages of the present invention will be more apparent from the following detailed description which in conjunction with the accompanying drawing discloses to those skilled in the art the construction and operation of several preferred forms of the invention.

In the drawings:

Fig. 3 is a transversal sectional view on line 3—3 of Fig. 4.

Fig. 4 is a cross-sectional view on line 4—4 of Fig. 3.

Figure 1:
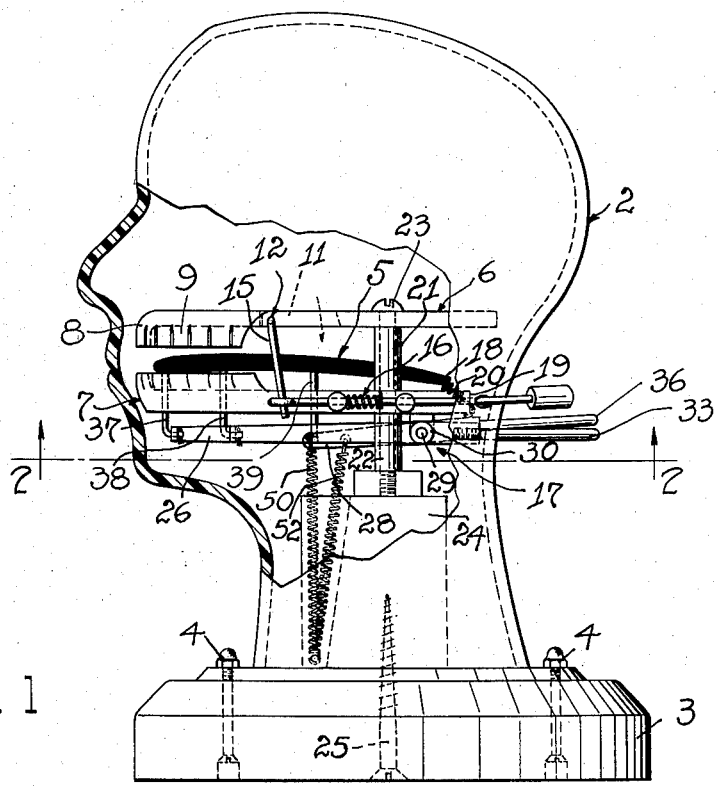
Fig. 1 is a side view, partly broken away, of an educational apparatus constructed in accordance with the invention.
Figure 2:
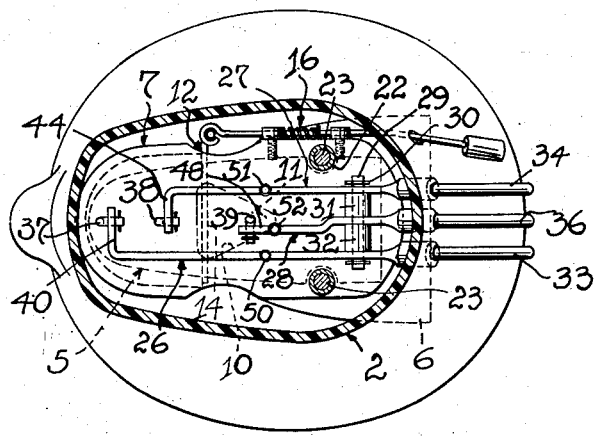
Fig. 2 is a cross-sectional view on line 2—2 of Fig. 1.

Referring now more in detail to the exemplified form of the invention shown in Figs. 1 through 4, reference numeral 2 denotes an outer shell of transparent material simulating a human head, which shell is supported on a wooden base 3 and secured thereto by bolt members 4. The transparent shell has arranged therein a flexible tongue member 5, preferably made of pliable latex or similar material, which member is located between two vertically spaced plates 6 and 7. Plate 6, the upper plate, representing the roof of the mouth of the head, generally called the palate, is made of transparent material and flanged at its front end at 8 to simulate upper teeth 9 for the mouth. Plate 6 in addition includes a portion simulating the soft palate of the roof of the mouth and for such purpose has pivoted to the side walls of a triangularly-shaped, cut-out portion 10 in said palate, a shiftable palate member 11 which includes an angularly bent pivot member 12. The one arm 14 of pivot member 12 is secured to palate member 11 and the other arm 15 is extended downwardly and coupled with a spring pressed plunger arrangement 16 having its outer end extended through the wall of shell 2 at the rear neck portion thereof for manual operation of the palate member 11, as will be later described.

Plate 7, the lower plate member, indicating the bottom portion of the mouth forms a guide member for an operating mechanism 17 controlling the tongue member 5 which has its rear portion 18 yieldingly secured to the rear portion 19 of plate 7, a coil spring 20 being used for this purpose.

The plates 6 and 7 are supported and held in properly spaced relation with respect to each other by spacer members 21 and 22 and bolts 23 which are secured to a base block 24, attached to wooden base 3 by a screw member 25.

The operating mechanism 17 embodies three lever members 26, 27 and 28 which differentiate in length and are pivotally mounted on a pivot pin 29 supported in ear portions 30 downwardly extended from lower plate 7. These lever members are properly spaced from each other by tubular spacing members 31, 32 and have their rear portions 33, 34 and 36 extended outwardly through the wall of shell 2 at the rear neck portion thereof for manual operation of these lever members, which effect the control of the tongue member. The front portions of the lever members are pivotally coupled with rod members 37, 38 and 39 secured to spaced locations of tongue member 5 axially thereof. Thus lever member 26 has its angularly bent front portion 40 pivotally coupled with rod member 37 which is slidably extended through a vertical bore 41 in plate 7 and threadedly connected with a washer 42 arranged near the front edge of the tip portion 43 of tongue member 5 axially thereof. Lever member 27 has its angularly bent front portion 44 coupled with rod member 38 which is slidably extended through a vertical bore 45 in plate 7 and threadedly connected with a washer 46 arranged in the central area of the front portion 47 of tongue member 5 axially thereof. Finally lever member 28 has its front portion 48 pivotally coupled with rod member 39 which is slidably extended through a vertical bore 45 in plate 7 and threadedly connected with a washer 49 arranged in the central area of tongue member 5 axially thereof.

The three lever members 26, 27 and 28 which are limited in their downward movement by engagement with the rear edge of plate 7 (levers 27 and 28) and by engagement of the tip of tongue member 5 with the front portion of plate 7 are yieldingly forced into engagement with plate 7 by coil springs 50, 51 and 52 which are engaged with these levers and secured to base block 24.

The described lever arrangement permits shifting of the pliable tongue member 5 into various positions and shaping of such tongue member to various configurations necessary for producing articulate and intelligible sounds in the pronunciation of vowels, consonants and general combinations thereof. Thus, lever 26 raises the tip of the tongue against the back of the upper front teeth, a position necessary for producing the sound for consonants such as "t," "d" and "n." The lever 27 raises the central area of the front portion of the tongue, a position necessary for producing the sound for the combination of consonants such as "ch," "sh" soft "g," etc. The lever 28 raises the central portion of the tongue, a position necessary for producing consonants such as "k" and hard "g." Finally operation of the spring pressed plunger arrangement 16, effecting lowering of the shiftable palate member 11, which plunger arrangement is used in conjunction with lever member 28, shows the relative position of the palate member and tongue necessary for producing nasal sounds such as "ing," "ang," "ink," etc., which nasal sounds necessitate closing of the nasal passage.

Figure 5:
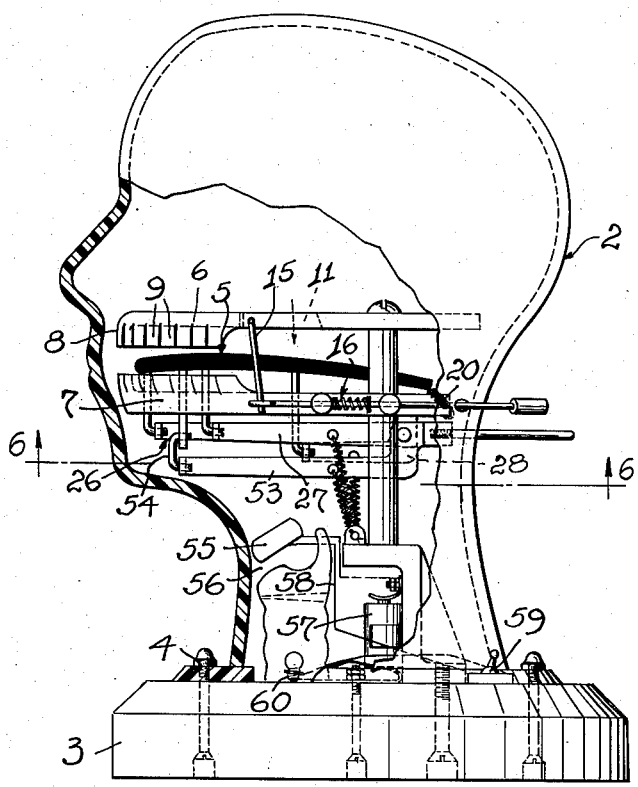
Fig. 5 is a somewhat modified form of the educational apparatus shown in Fig. 1, the apparatus including operating means for transversely curving the tongue member and electrically-operated vibrating and illuminating means.
Figure 6:
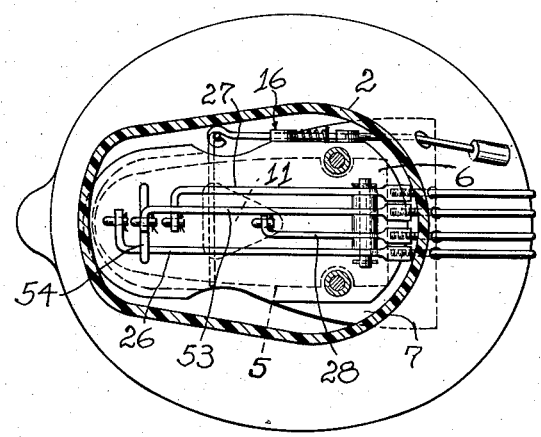
Fig. 6 is a cross-sectional view on line 6—6 of Fig. 5.

The somewhat modified arrangement of Figs. 5 and 6 shows in addition to the operating mechanism disclosed in Figs. 1 through 4, a lever member 53 actuating a U-shaped rod member 54 secured to tongue member 5 in symmetrically arranged places at opposite sides of the axis of the tongue member. Lever member 53 is pivotally mounted on pivot pin 29 and slidably coupled with the U-shaped rod member 54 so as to effect upward lifting of the edges of the front portion of tongue member 5 into a position necessary for producing the sound for "r," "w" and "u."

The modified arrangement in addition includes a vibrator 55 arranged in the throat 56 of the device simulating the larynx or voice organ situated at the upper part of the windpipe. This vibrator is operated by a small battery 57 mounted on the base 3 and electrically coupled with the vibrator by a circuit 58 controlled by a switch 59. The circuit includes a small electric lamp or bulb 60 which lights up when the vibrator is operated and thus permits seeing and feeling of the place of vibration of the larynx necessary for producing voiced sounds such as hard "g," etc.

Having thus described my invention:

What I claim is:

1. In an educational apparatus spaced plates simulating the roof and bottom of the mouth of a person, a pliable member arranged between said plates simulating the tongue of the person, shifting means, and a plurality of shifting rods coupled at one end with spaced areas of said pliable member, said shifting rods being extended through and guided by the lower one of said plates and said shifting rods being pivotally coupled with said shifting means to effect by shifting of said rods by said shifting means, shaping of the pliable member to configurations similar to the shapes and configurations of the tongue of a person producing articulate and intelligible sounds in the pronunciation of vowels, consonants and general combinations thereof.

2. In an educational apparatus, a frame structure, a shell of transparent material mounted on said frame structure and having the general outline of the head of a person, a pliable elongated member arranged within said shell and secured to said frame structure, said pliable member having the general outline of the tongue of the person, and shifting means within said shell and mounted on said frame structure, said shifting means being coupled with spaced areas of said pliable member lengthwise thereof, and including portions extended outwardly of said shell through the wall thereof, to effect by their actuation shifting and shaping of said pliable member to configurations similar to those of the tongue of a person when producing articulate and intelligible sounds in the pronunciation of vowels, consonants and general combinations thereof.

3. An educational apparatus as described in claim 2 including vertically spaced plates having the pliable member arranged therebetween and having the general outline of the roof and bottom of the mouth of the person, a shiftable portion in the upper one of said plates having the general outline of the soft palate in the roof of the mouth and shifting means mounted on the frame structure and actuating said shiftable portion to indicate narrowing of the throat opening at the rear end of the mouth of a person when producing certain sounds in the pronunciation of certain syllables, vowels and consonants.

4. An educational apparatus as described in claim 3, wherein the lower one of said plates includes means to support a pivot shaft, wherein the shifting means for pliable member consists of lever means mounted on said pivot shaft, and wherein said pliable member has secured to definite areas thereof downwardly extending shifting rods guided in said lower plate and pivotally coupled with said lever means.

5. An educational apparatus as described in claim 4, wherein the upper one of said plates is made of transparent material, wherein the shiftable portion in the upper one of said plates is hinged to said upper plate and includes a downwardly extended lever arm, and wherein the lower one of said plates mounts a spring-pressed plunger arrangement pivotally coupled with said lever arm.

6. In an educational apparatus a pliable member simulating the tongue of a person, a plurality of substantially straight shifting rods secured to and downwardly extended from said pliable member axially thereof, a U-shaped shifting rod secured with its arms to symmetrically arranged areas of said pliable member, and a shifting lever for each of said substantially straight shifting rods and said U-shaped shifting rod, said shifting levers being pivotally coupled with the end portions of said straight shifting rods and one of said shifting levers being coupled with the web portion of said U-shaped shifting rod.

7. An educational apparatus as described in claim 6, including spaced plates having the pliable member arranged therebetween and simulating the roof and bottom of the mouth of the person, a shiftable portion in the upper one of said plates simulating the soft palate in the roof of the mouth and shifting means for actuating said shiftable portion, said shifting rods being extended from said pliable member, guided in the lower one of said spaced plates and the said lever means and shifting means being supported by said lower one of said plates.

8. In an educational apparatus a frame structure, a pliable, elongated member with a general outline of the tongue of a person secured to said frame structure, a plurality of shifting means mounted on said frame structure, and coupling members connecting said shifting means with spaced areas of said pliable member, said coupling members being attached to spaced areas of said pliable member to permit by said shifting means shaping of such member to configurations similar to those of the tongue of a person when producing articulate and intelligible sounds in the pronunciation of vowels, consonants and general combinations thereof.

9. In an educational apparatus a frame structure including vertically spaced plates shaped to the general outline of the roof and bottom of the mouth of a person, an elongated pliable member arranged between said plates and secured at one end to said frame structure, said pliable member having the general outline of the tongue of a person, a plurality of shifting means mounted on the frame structure, and coupling members connecting said shifting means with spaced areas of said pliable member, lengthwise therefrom to permit by said shifting means shaping of said pliable member to configurations similar to those of the tongue of a person when producing articulate and intelligible sounds in the pronunciation of vowels, consonants and general combinations thereof.

10. In an educational apparatus a frame structure, vertically spaced plates mounted on said frame structure and having the outline of the roof and bottom of the mouth of a person, a shiftable portion in the upper one of said plates having the general outline of the soft palate of the roof of the mouth of a person, shifting means mounted on said frame structure, a coupling member connecting said shifting means with said shiftable portion for actuating same, a pliable, elongated member arranged between said plates having the general outline of the tongue of a person, a plurality of other shifting means mounted on said frame structure, and coupling means connecting said other shifting means with spaced areas of said pliable member, all said shifting means cooperating in effecting shifting of the shiftable portion and the pliable member to positions and configurations similar to those of the soft palate and tongue of a person when producing articulate and intelligible sounds in the pronunciation of vowels, consonants and general combinations thereof.

FRANCES FARR OLSON.

REFERENCES CITED

The following references are of record in the file of this patent:

UNITED STATES PATENTS

| Number | Name | Date |
| --- | --- | --- |
| 1,850,899 | Smith | Mar. 22, 1932 |
| 2,045,962 | Rastetter | June 30, 1936 |